United States Patent
Kang et al.

(10) Patent No.: US 8,503,955 B2
(45) Date of Patent: Aug. 6, 2013

(54) APPARATUS AND METHOD FOR DETECTING SIGNAL IN COMMON FREQUENCY BAND

(75) Inventors: Kyu-Min Kang, Daejeon (KR); Sang-In Cho, Daejeon (KR); Heon-Jin Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 337 days.

(21) Appl. No.: 12/839,733

(22) Filed: Jul. 20, 2010

(65) Prior Publication Data
US 2011/0151812 A1 Jun. 23, 2011

(30) Foreign Application Priority Data
Dec. 21, 2009 (KR) .................. 10-2009-0128525

(51) Int. Cl.
H04B 1/16 (2006.01)
(52) U.S. Cl.
USPC .................. 455/161.1; 455/179.1
(58) Field of Classification Search
USPC .......... 455/161.1, 161.2, 161.3, 168.1, 179.1, 455/180.1; 370/332, 230; 348/732, 845.3
See application file for complete search history.

(56) References Cited

U.S. PATENT DOCUMENTS

| | | | |
|---|---|---|---|
| 5,515,300 A * | 5/1996 | Pierce | 702/190 |
| 7,528,751 B2 | 5/2009 | Park et al. | |
| 8,077,676 B2 * | 12/2011 | Chang | 370/332 |
| 8,154,616 B2 * | 4/2012 | Icho et al. | 348/222.1 |
| 2007/0100922 A1 * | 5/2007 | Ashish | 708/400 |
| 2008/0214130 A1 | 9/2008 | Park et al. | |
| 2009/0102981 A1 * | 4/2009 | Mody | 348/732 |
| 2010/0035568 A1 * | 2/2010 | Ghosh | 455/192.1 |
| 2010/0182928 A1 * | 7/2010 | Wu et al. | 370/252 |

FOREIGN PATENT DOCUMENTS

| | | |
|---|---|---|
| KR | 100835077 | 5/2008 |
| KR | 2008-0098874 A | 11/2008 |
| KR | 10-0887154 A | 2/2009 |

OTHER PUBLICATIONS

Tevfik Yücek et al., "A Survey of Spectrum Sensing Algorithms for Cognitive Radio Applications", IEEE Communications Surveys & Tutorials, vol. 11, No. 1, pp. 116-130, First Quarter 2009.

* cited by examiner

*Primary Examiner* — Blane J Jackson
(74) *Attorney, Agent, or Firm* — Rabin & Berdo, P.C.

(57) ABSTRACT

An apparatus for detecting a signal in a common frequency band includes: a signal processor configured to extract a selected band signal from received wireless signals by filtering the received wireless signal based on a frequency selection control signal, convert the extracted signal to a baseband signal, and detect a predetermined signal; a sensing signal determiner configured to determine existence of the signal, output a determination result, and outputs a frequency selection generating signal when the predetermined signal is absent; and a frequency selection controller configured to output the frequency selection control signal by selecting a target band among a plurality of previously decided bands.

10 Claims, 3 Drawing Sheets

APPARATUS AND METHOD FOR DETECTING SIGNAL IN COMMON FREQUENCY BAND

CROSS-REFERENCE(S) TO RELATED APPLICATIONS

The present application claims priority of Korean Patent Application No. 10-2009-0128525, filed on Dec. 21, 2009, which is incorporated herein by reference in its entirety.

BACKGROUND OF THE INVENTION

1. Field of the Invention

Exemplary embodiments of the present invention relate to an apparatus and a method for detecting a signal in a common frequency band; and, more particularly, to a signal detection apparatus and a method thereof for sensing spectrum in a common frequency band.

2. Description of Related Art

Wireless communication is essentially used in almost all of systems and devices in a ubiquitous society. In such ubiquitous society, frequency shortage has been magnified as the most major problem. As one of solutions to overcome the frequency shortage problem, a common frequency band concept has been introduced to effectively use frequencies. The common frequency band concept allows heterogeneous wireless communication technologies to commonly use a predetermined frequency band.

Recently, Federal Communications Commission (FCC) allows unlicensed use of an unused TV frequency band called "white spaces". Accordingly, many studies and researches have been actively and globally conducted on a spectrum sharing technology to use the TV frequency band. It is also expected that various dynamic spectrum access technologies would be introduced to share the TV frequency band. Further, a spectrum management technology is also required to control various wireless devices using different communication protocols to share a common frequency band without interference. In order to share the common frequency band, various spectrum sensing technologies have been used.

As a method for determining channel availability, a signal processing algorithm or a channel usage database has been widely used.

As a spectrum sensing technology using a signal processing algorithm, an energy detection based sensing method, a waveform based sensing method, a spectral correlation based sensing method, a radio identification based sensing method, and a matched filter based sensing method have been introduced.

A spectrum sensing technology using a channel usage database can stably detect a signal without a hidden terminal problem. However, the spectrum sensing technology using the channel usage database has drawback. Due to shadow fading or multipath fading, the channel usage database may not be accessed occasionally. Therefore, all devices are required to have capability of detecting a signal through a sensing algorithm.

Recently, many studies have been made to develop a cooperative spectrum sensing technology to overcome the hidden terminal problem. The cooperative spectrum sensing technology allows multiple users to share an individual sensing result with other users. Therefore, each user determines spectrum occupation based on the shared sensing result in the cooperative spectrum sensing technology.

FCC clearly states that all devices must have capability to detect a first user signal through a spectrum sensing algorithm in order to use personal/portable service devices as well as fixed wireless service devices and protect a first user of TV band. That is, FCC suggests detecting an ATSC digital TV signal, a NTSC analog TV signal, and a wireless microphone signal using sensing threshold values of −114 dBm/6 MHz, −114 dBm/100 kHz, and −114 dBm/200 kHz. Here, ATSC stands for Advanced Television Systems Committee and NTSC stands for National Television System Committee.

Meanwhile, an IEEE 802.22 standard group also suggests a wireless regional area network (WRAN) system to detect the ATSC digital TV signal, the NTSC analog TV signal, and the wireless microphone signal using sensing threshold values of −116 dBm/6 MHz, −94 dBm/6 MHz, and −107 dBm/200 kHz.

SUMMARY OF THE INVENTION

An embodiment of the present invention is directed to an apparatus and method for detecting a signal by applying different sensing threshold values through two stages in sensing a target signal spectrum in a common frequency band.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for detecting a signal in a common frequency band includes: a signal processor configured to extract a selected band signal from received wireless signals by filtering the received wireless signal based on a frequency selection control signal, convert the extracted signal to a baseband signal, and detect a predetermined signal; a sensing signal determiner configured to determine existence of the signal, output a determination result, and outputs a frequency selection generating signal when the predetermined signal is absent; and a frequency selection controller configured to output the frequency selection control signal by selecting a target band among a plurality of previously decided bands.

In accordance with another embodiment of the present invention, a method for detecting a signal in a common frequency band, including: extracting a selected band signal from received wireless signals by filtering the received wireless signal based on a frequency selection control signal, converting the extracted signal to a baseband signal, and calculating signal intensity of the baseband signal; determining existence of a predetermined signal, outputting a determination result, and outputting a frequency selection generating signal when the predetermined signal is absent; and outputting the frequency selection control signal by selecting a target band to search among a plurality of bands previously decided from the outputted frequency selection generating signal.

DESCRIPTION OF SPECIFIC EMBODIMENTS

Figure 1:
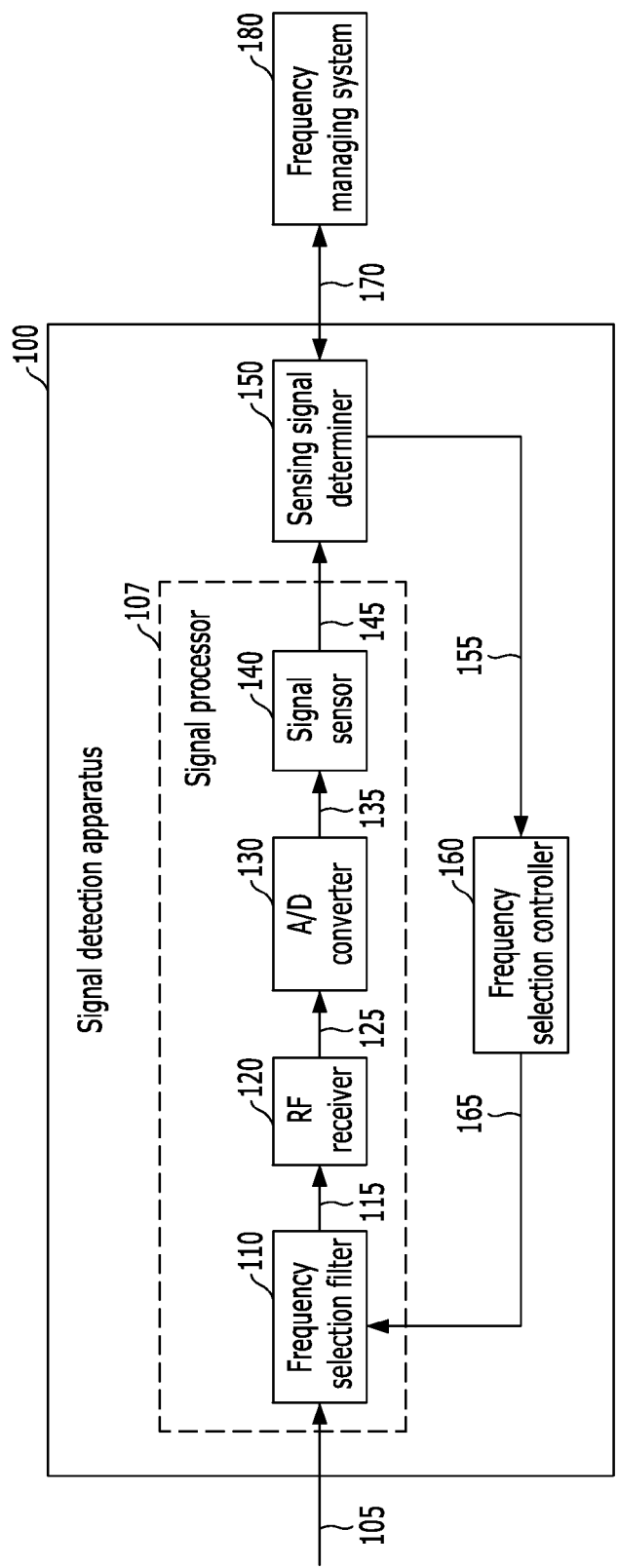
FIG. 1 is a block diagram illustrating a signal detection apparatus for sensing a selected frequency band signal in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention FIG. 1 is a block diagram illustrating a signal detection apparatus for sensing a selected frequency band signal in accordance with an embodiment of the present invention.

The signal detection apparatus 100 according to the present embodiment determines whether a predetermined frequency band of a common frequency band is used by another communication system or not.

The signal detection apparatus 100 according to the present embodiment includes a signal processor 107, a sensing signal determiner 150, a frequency selection controller 160, and a frequency managing system 180.

The signal processor 107 includes a frequency selection filter 110, a radio frequency (RF) receiver 120, an analog/digital (A/D) converter 130, and a signal sensor 140.

The frequency selection filter 110 receives a radio frequency (RF) signal 105 from an antenna (not shown) and a frequency selection control signal 165 from the frequency selection controller 160. Then, the frequency selection filter 110 extracts a target signal in a corresponding frequency band from the received RF signal 105 based on the frequency selection control signal 165 by filtering the received RF signal 105.

The RF receiver 120 receives the extracted signal 115 from the frequency selection filter 110 and converts the extracted signal 115 to a baseband signal 125. The A/D converter 130 receives the analog baseband signal 125 from the RF receiver 120 and converts the analog baseband signal 125 to a digital signal 135.

The signal sensor 140 calculates signal intensity 145 of the digital signal 135 from the A/D converter 130. The sensing signal determiner 150 determines existence of a predetermined signal using the calculated signal intensity 145. Here, the sensing signal determiner 150 may use various sensing methods such as an energy detection based sensing method, a waveform based sensing method, a spectral correlation based sensing method, a radio identification based sensing method, and a matched filter based sensing method.

The sensing signal determiner 150 compares two types of previously decided sensing threshold values with the calculated signal intensity 145, determines whether a target signal is in a corresponding frequency band or not based on the comparison result, and informs the frequency managing system 180 of the determination result. For example, the sensing signal determiner 150 compares the calculated signal intensity 145 from the signal sensor 140 with two types of previously decided sensing threshold values through two spectrum sensing stages.

At the first spectrum sensing stage, the sensing signal determiner 150 compares the calculated signal intensity 145 with a first sensing threshold value suggested by the FCC or the IEEE standard group. Then, the sensing signal determiner 150 determines whether any signal in a $k^{th}$ frequency band is used or not based on the determination result. If the signal intensity 145 is greater than the first sensing threshold value suggested by the FCC or the IEEE standard group, the sensing signal determiner 150 determines that a signal in the $k^{th}$ frequency band is in use. If the signal intensity 145 is smaller than the first threshold value, a second spectrum sensing stage is performed.

At the second spectrum sensing stage, the sensing signal determiner 150 determines again whether any signal in a $k^{th}$ frequency band is in use or not using a second threshold value which is a minimum sensing threshold that a typical wireless communication system can use. Then, the sensing signal determiner 150 informs the frequency managing system 180 of the determination result.

In fact, if the signal intensity 145 is smaller than the first sensing threshold value at the first spectrum sensing stage, the sensing signal determiner 150 uses the minimum sensing threshold value that a typical wireless communication system can perform as the second threshold value at the second spectrum sensing stage. That is, at the second spectrum sensing stage, the sensing signal determiner 150 compares the second threshold value with the signal intensity 145. If the signal intensity 145 is smaller than the second threshold value, the sensing signal determiner 150 determines that no signal in the $k^{th}$ frequency band is in use. Accordingly, this common frequency band can be used.

The sensing threshold values may be previously stored in a storing device such as a memory or a register, which are not shown in FIG. 1.

Meanwhile, if it is necessary to continuously search a signal in the other frequency band, the sensing signal determiner 150 transfers a frequency selection generating signal 155 to the frequency selection controller 160 as an input value. For example, if the signal intensity 145 from the signal sensor 140 is greater than the first threshold value or the second threshold value, the sensing signal determiner 150 determines the searched frequency band is already in use. Thus, the sensing signal determiner 150 transfers the frequency selection generating signal 155 to the frequency selection controller 160.

The frequency selection controller 160 generates a frequency selection control signal 165 to control the frequency selection filter 110 to pass a target frequency band signal.

Although FIG. 1 illustrates the signal detection apparatus according to the embodiments that uses a baseband digital signal to sense spectrum and detect a signal, a signal detection apparatus according to another embodiments of the present invention can use a passband digital signal, a baseband analog input signal, and a passband analog input signal to sense spectrum and detect a signal.

The frequency selection filter 110 may be disposed behind the RF receiver 120 or the A/D converter 140 according to an implementation method.

According to the present embodiment, when a wireless device wants to use a predetermined frequency band although the predetermined frequency band is not used by a TV signal in case of a TV frequency band, a wireless device firstly determines whether or not the predetermined frequency band is used by a wireless microphone using sensing threshold values of −114 dBm/200 kHz suggested by the FCC and −107 dBm/200 kHz suggested by the IEEE 802.22 standard group.

That is, if a signal intensity obtained as a result of spectrum sensing of a wireless microphone in a predetermined frequency band that a wireless device wants to use is greater than −114 dBm/200 kHz or −107 dBm/200 kHz, it is determined that a corresponding frequency band is in use by a wireless microphone system. Thus, other frequency band is searched to use.

On the contrary, if a signal intensity obtained as a result of spectrum sensing of a wireless microphone in a predetermined frequency band that a wireless device wants to use is smaller than −114 dBm/200 kHz or −107 dBm/200 kHz, it is determined that a corresponding frequency band is not in use by a wireless microphone system. Therefore, the corresponding frequency band is used after determining whether another heterogeneous system exists or not.

Figure 2:
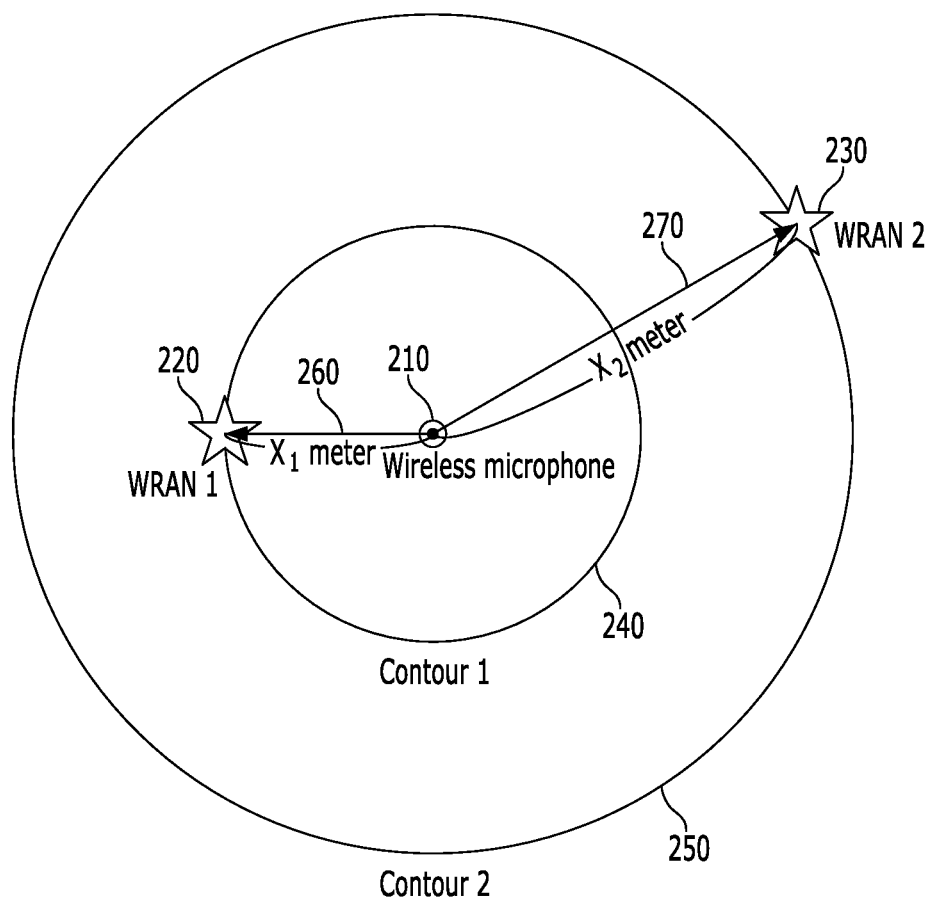
FIG. 2 is a diagram depicting a distance between a wireless microphone and a WRAN system for explaining a signal detection apparatus for sensing a selected frequency band signal by applying different sensing threshold values through two spectrum sensing stages in accordance with an embodiment of the present invention.

FIG. 2 is a diagram depicting a distance between a wireless microphone and WRAN systems for explaining a signal detection apparatus for sensing a selected frequency band signal by applying different sensing threshold values through two spectrum sensing stages in accordance with an embodiment of the present invention.

As shown in FIG. 2, a wireless microphone 210, a first WRAN 220, and a second WRAN 230 are illustrated in the diagram. The wireless microphone 210 is using a $K^{th}$ TV frequency band. The first WRAN 220 denotes a wireless communication device located at a first contour 240 and using a $K^{th}$ TV frequency band. That is, the first WRAN 220 is $X_1$ meter away from the wireless microphone 210. The $X_1$ meter is a distance corresponding to a sensing threshold value suggested by the FCC or the IEEE standard group. The second WRAN 230 is a wireless communication device located at a second contour 250 and using a $k^{th}$ TV frequency band. That is, the second WRAN 230 is X2 meter away from the wireless microphone 210. The X2 meter is a distance corresponding to a minimum sensing threshold value that a typical signal detection apparatus in a second WRAN receiver can perform.

A typical WRAN system uses only one sensing threshold value suggested by the FCC or the IEEE standard group in order to determine whether or not a wireless microphone uses a $k^{th}$ frequency band when the typical WRAN system wants to use the $k^{th}$ frequency band. Accordingly, when a WRAN system is located within the first contour 240, the WRAN system detects the wireless microphone and does not use the $k^{th}$ frequency band.

However, when a WRAN system is located between the first contour 240 and the second contour 250, the WRAN system cannot detect the microphone. Accordingly, the WRAN system mistakenly determines that the $k^{th}$ frequency band is available and uses the $k^{th}$ frequency band. It is because a transmission signal intensity of the WRAN system is comparatively strong and a transmission signal intensity of the microphone is very weak. In addition, a very weak wireless microphone signal is transferred to a wireless microphone receiver due to a signal fading influence which is caused by human body absorbing a wireless microphone signal when the wireless microphone signal is transmitted. That is, in the wireless microphone receiver, a wireless microphone signal intensity does not satisfy a signal to noise ratio ($E_b/N_o$) required to operate a wireless microphone system. Accordingly, it is impossible to normally operate a wireless microphone system in a $k^{th}$ frequency band.

For example, a wireless microphone transmitter using a $k^{th}$ TV frequency band is A meter away from an IEEE 802.22 WRAN receiver that wants to use a $k^{th}$ TV frequency band. The A meter is a distance little longer corresponding to a sensing threshold value of −114 dBm/200 kHz. In this case, the WRAN system may determine that the wireless microphone system does not use the $k^{th}$ frequency band. As a result, the WRAN system exchanges a signal with a WRAN base station and WRAN customer premises equipments (CPEs).

In this case, the transmission signal intensity of the IEEE 802.22 WRAN is comparatively stronger than a transmission signal intensity of a microphone. In addition, a very weak signal is transmitted to a wireless microphone receiver due to signal fading influence which is caused by human body absorbing a microphone signal when the microphone signal is transmitted.

That is, when a wireless microphone transmitter is A meter away from a WRAN receiver and the wireless microphone transmitter and the WRAN receiver use the same frequency band, a wireless microphone signal intensity at a wireless microphone receiver does not satisfy a signal to noise ratio ($E_b/N_o$) required to operate a wireless microphone system. Therefore, a wireless microphone system cannot be normally operated at a $k^{th}$ frequency band.

As described above, only one sensing threshold value may be used to perform spectrum sensing in determining whether or not a predetermined frequency band is in use in a common frequency band which is commonly used by heterogeneous systems. In this case, a system may not be normally operated due to interference signals from other system if a required signal to noise ratio ($E_b/N_o$) is comparatively high or if a transmission signal or a receiving signal of a system is comparatively weak.

Thus, it is required to perform spectrum sensing in a signal intensity level further lower than a sensing threshold value suggested by the FCC or the IEEE standard group in order to safely operate a system.

In order to overcome such a problem, a signal detection method according to the present embodiment applies different sensing threshold values through two spectrum sensing stages. At the first spectrum sensing stage, a sensing threshold value suggested by the FCC or the IEEE standard group is used to determine whether a signal included in a $k^{th}$ frequency band is used or not at first. Then, at the second spectrum sensing stage, a minimum sensing threshold value that a WRAN system can perform is used again to determine whether a signal in a $k^{th}$ frequency band is used or not. Then, a determination result is informed to a frequency managing system.

The signal detection method according to the present invention can expand a service coverage that a wireless microphone system can safely use in a common frequency band from the first contour 250 to the second contour 260.

Also, the minimum sensing threshold value may differ according to a signal detection algorithm or implementation method of a wireless device at the second spectrum sensing stage. That is, in case of a wireless device having a superior sensing performance, a sensing threshold value much smaller than that applied at the first spectrum sensing stage is used to perform spectrum sensing at the second spectrum sensing stage. In case of a wireless device having a poor sensing performance, a sensing threshold value little smaller than that applied at the first spectrum sensing stage or about the same sensing threshold value is used to perform spectrum sensing at the second spectrum sensing stage. Then, the result of spectrum sensing is informed to the frequency managing system.

As all wireless devices perform the signal detection method according to the present embodiment in a common frequency band, the frequency managing system accumulates reliable spectrum sensing information. That is, the more spectrum sensing is performed in the common frequency band, the more reliable spectrum sensing information is accumulated in the frequency managing system.

Accordingly, it is possible to safely operate the common frequency band by using database information in the frequency managing system when a wireless device selects a frequency in a common frequency band.

Although FIG. 2 illustrates a wireless microphone and an IEEE 802.22 WRAN system used in a TV frequency band for convenience, the signal detection apparatus and method according to the present embodiment can be applied to heterogeneous communication systems used in any common frequency bands.

Figure 3:
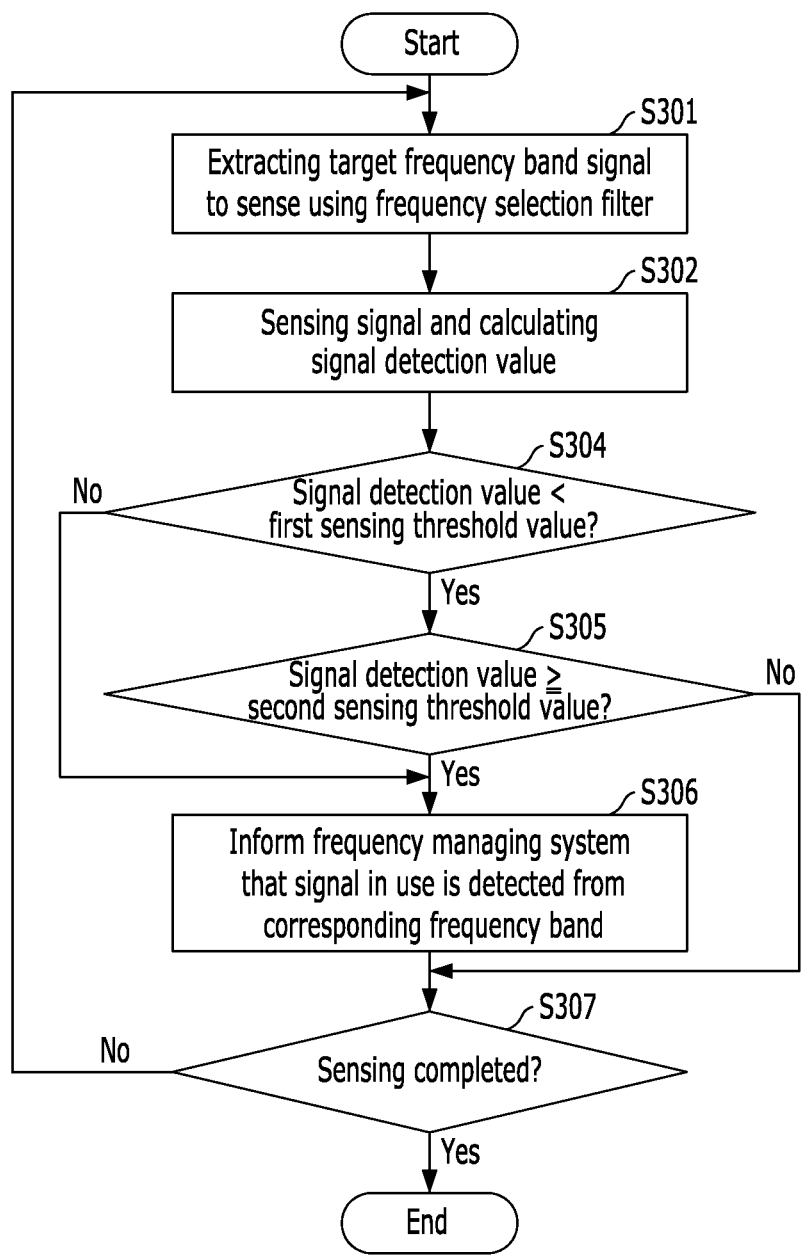
FIG. 3 is a flowchart showing a method for operating a signal detection apparatus for sensing a selected frequency band signal by applying different sensing threshold values through two spectrum sensing stages in accordance with an embodiment of the present invention.

FIG. 3 is a flowchart illustrating a method of operating a signal detection apparatus using different sensing threshold values through two spectrum sensing stages in accordance with an embodiment of the present invention.

As shown in FIG. 3, the method includes the following steps.

At step S301, a frequency selection filter 110 determines whether or not a predetermined frequency band in a common frequency band is used by other system, filters a frequency band signal to sense from an input signal 105 based on a frequency selection control signal 165, and transfers the filter signal to a RF receiver 120.

At step S302, a signal sensor 140 senses a signal using a baseband digital signal from a RF receiver 120 and an A/D converter 130, calculates a signal detection value thereof, and transfers the calculated signal intensity to a sensing signal determiner 150.

At step S304, the sensing signal determiner 150 compares the signal detection value with a first sensing threshold value. The first sensing threshold value is previously stored in a storing device. If the signal detection value is smaller than the first sensing threshold value, following step S305 is performed. If not, the sensing signal determiner 150 informs a frequency management system that a corresponding frequency band is in use at step S306.

At step S305, if the signal detection value is smaller than the first sensing threshold value, the sensing signal determiner 150 compares the signal detection value with a second sensing threshold value. Here, the second sensing threshold value is also previously stored in a storing device. If the signal detection value is larger than a second sensing threshold value, following step S306 is performed. If not, sensing completion is checked at step S307.

At step S306, the sensing signal determiner 150 informs the frequency management system that a signal in use is detected from a corresponding frequency band.

At step S307, it is determined whether spectrum sensing is completed or not. If the spectrum sensing is completed, the method is terminated. If not, the step S301 is performed again for filtering a receiving signal at the frequency selection filter 110.

As described above, the signal detection apparatus and method according to the present embodiments applies different sensing threshold values through two spectrum sensing stages in order to sense spectrums of heterogeneous signals in a common frequency band. Therefore, the signal detection apparatus and method according to the present embodiment can expand a service coverage that can be safely used by wireless devices in a common frequency band.

According to the present embodiment, the more spectrum sensing is performed in the common frequency band at adjacent areas, the more reliable spectrum sensing information is accumulated in the frequency managing system. Accordingly, it is possible to safely operate the common frequency band by using database information in the frequency managing system when a wireless device selects a frequency in a common frequency band.

While the present invention has been described with respect to the specific embodiments, it will be apparent to those skilled in the art that various changes and modifications may be made without departing from the spirit and scope of the invention as defined in the following claims.

What is claimed is:

1. An apparatus for detecting a signal in a common frequency band, comprising:
    a signal processor configured to extract a selected band signal from received wireless signals by filtering the received wireless signal based on a frequency selection control signal, convert the extracted signal to a baseband signal, detect a predetermined signal, and calculate a signal intensity of the detected signal;
    a sensing signal determiner configured to determine existence of the signal by comparing the signal intensity with a first sensing threshold value and a second sensing threshold value, output a determination result, and outputs output a frequency selection generating signal when the predetermined signal is absent; and
    a frequency selection controller configured to output the frequency selection control signal to select a target frequency band signal to search among a plurality of previously selected frequency band signals.

2. The apparatus of claim 1, wherein the signal processor includes:
    a frequency selection filter configured to extract a selected band signal from the received wireless signals by filtering the received wireless signals;
    a radio frequency (RF) receiver configured to convert the extracted signal to a baseband signal; and
    a signal sensor configured to calculate the signal intensity of the detected signal from the baseband signal.

3. The apparatus of claim 2, wherein the signal processor further includes:
    an analog/digital (A/D) converter configured to convert the baseband signal to a digital signal when the signal sensor processes only a digital signal.

4. The apparatus of claim 1, wherein the sensing signal determiner includes a storing unit for storing the first sensing threshold value and the second sensing threshold value, which are previously decided to determine existence of the predetermined signal.

5. The apparatus of claim 1, wherein the sensing signal determiner transfers a frequency selection generating signal as input of the frequency selection controller to search other wireless frequency band signal, and
    wherein the frequency selection controller generates the frequency selection control signal by selecting one of unsearched frequency bands upon receiving the frequency selection generating signal and outputs the generated frequency selection control signal.

6. The apparatus of claim 1, wherein the sensing signal determiner uses one of an energy detection based sensing method, a waveform based sensing method, a spectral correlation based sensing method, a radio identification based sensing method, and a matched filter based sensing method to determine existence of the predetermined signal.

7. A method for detecting a signal in a common frequency band, comprising:
    extracting a selected band signal from received wireless signals by filtering the received wireless signal based on a frequency selection control signal, converting the extracted signal to a baseband signal, and calculating signal intensity of the baseband signal;

determining existence of a predetermined signal by comparing the signal intensity with a first sensing threshold value and a second sensing threshold value, outputting a determination result, and outputting a frequency selection generating signal when the predetermined signal is absent; and outputting the frequency selection control signal to select a target frequency band signal to search among a plurality of signals previously decided from the outputted frequency selection generating signal.

8. The method of claim 7, wherein said extracting a selected band signal includes:

extracting a selected band signal from the received wireless signals based on the frequency selection control signal by filtering the received wireless signals;

converting the extracted signal to a baseband signal; and calculating signal intensity of the baseband signal.

9. The method of claim 7, further comprising converting the baseband signal to a digital baseband signal when a digital signal processor performs said determining existence of a predetermined signal.

10. The method of claim 7, wherein in said determining existence of a predetermined signal, one of an energy detection based sensing method, a waveform based sensing method, a spectral correlation based sensing method, a radio identification based sensing method, and a matched filter based sensing method is used.

* * * * *